United States Patent Office 2,868,655
Patented Jan. 13, 1959

2,868,655

SALT TABLETS CONTAINING AN ETHYLENE-DIAMINETETRACETIC ACID COMPOUND AND PROCESS OF PRODUCING THE SAME

Kurt Ladenburg, Chappaqua, N. Y., assignor to International Salt Company, Inc., Scranton, Pa., a corporation of New Jersey No Drawing. Application December 31, 1956
Serial No. 631,401

17 Claims. (Cl. 99—143)

This invention relates to the production of salt tablets and more particularly to the production of salt tablets containing an ethylenediaminetetracetic acid compound.

In the processing of canned seafoods such as shellfish, crustaceans, haddock, cod and other members of the Gadidae family, and salmon, it has been previously proposed to treat the seafood prior to canning with an ethylenediaminetetracetic acid (hereinafter referred to as EDTA) compound in order to preserve the natural color, flavor and appearance of the canned seafood and to prevent the formation of struvite crystals in the can; see for example U. S. Patents 2,669,520 and 2,680,076. Since brine is commonly employed in the canning of seafoods, it would be highly desirable to provide to the canning trade a shaped self-sustaining composition of matter, hereinafter referred to as a tablet, containing predetermined amounts of sodium chloride, EDTA compound, and, if desired, other canning and preserving assistants such as aluminum salts and the like. One or more of such tablets could then be simply added to the seafood in the can or at a suitable stage prior thereto in order to provide in situ in the can the desired treating medium containing the sodium chloride, EDTA compound and the like. Other uses for such tablets are known or may be found.

Prior attempts to produce such tablets have, however, not met with any reasonable degree of success. While sodium chloride in finely divided form may be readily pressed in accordance with known methods into tablets, the inclusion therewith of even small amounts of EDTA compound has been found to render such tablet formation exceedingly difficult or impossible. The sodium chloride employed in the production of these tablets is generally in crystalline form having an average particle size of about 0.3-0.4 mm., at least about 85% of the particles passing a No. 30 screen. The water-soluble EDTA compounds, particularly the salts of EDTA such as the calcium disodium salt, are generally fine sticky powders which tend to agglomerate and lump when mixed in even small proportions with such sodium chloride particles. Such heterogeneous mixtures are obviously difficult to handle and shape into tablets. Further the tablets pressed from such mixtures are unsatisfactory in lacking sufficient cohesive forces, being subject to capping, crumbling and breaking, and in not containing the EDTA compound evenly distributed therethrough. A homogeneous evenly distributed composition is, of course, necessary since the medium in which the seafood is being treated should have a uniform ratio of EDTA compound to sodium chloride as the tablet dissolves. Still further, such heterogeneous mixtures of EDTA compound and sodium chloride tend to stick to the punches in the tablet machine, necessitating frequent delays for cleaning the punches, and yielding defective tablets. Attempts to simply add a mold lubricant such as calcium stearate or the like to the mixture to overcome the above described difficulties were not successful, the tablets formed therefrom being soft, crumbly, and containing an uneven distribution of the EDTA compound therethrough. The choice of mold lubricant or other additives is, of course, limited when the tablet is to be employed for treating substances intended for animal consumption.

It is an object of this invention to provide a process which will not be subject to the above disadvantages. Another object of this invention is the provision of a process for producing commercially acceptable, satisfactory and improved tablets containing sodium chloride and an EDTA compound. The provision of such tablets constitutes a still further object of this invention. Other objects and advantages will appear as the description proceeds.

The attainment of the above objects is made possible by the instant invention, which is based upon the discovery that satisfactory and improved tablets are obtained by a process comprising thoroughly admixing sodium chloride and at least about 0.5% of a water-soluble EDTA compound by weight of the sodium chloride with sufficient water to yield a substantially homogeneous paste, drying the paste, grinding the dried mixture into particles at least about 85% of which have a size passing a No. 30 screen, thoroughly admixing about 0.05 to 2.0% (by weight of the mixture) of a cohesive agent into the ground mixture, and pressing the resulting mixture into tablets. The process of this invention has been found to eliminate fouling of the tablet punches and to enable the production of firm, relatively hard, cohesive tablets having a uniform homogeneous composition throughout.

The sodium chloride employed in the instant invention should be composed of particles at least about 85%, and preferably at least 95%, of which have a size passing a No. 30 screen (U. S. Sieve Series), which has 0.59 mm. openings. When the tablet is to be employed in the treatment of seafoods as above described, it should be substantially free of iron, magnesium and copper, and should preferably contain less than about 1 p. p. m. (parts per million) of copper or iron and less than about 10 p. p. m. of magnesium.

The water-soluble EDTA compound preferably employed in the instant invention is the calcium disodium salt, but other compounds may be employed, such as EDTA and the mono-, di-, tri- or tetra-sodium, potassium, lithium or ammonium salts of EDTA. Such compounds are generally available as fine powders of a more-or-less sticky nature. While preferably admixed in proportions of about 0.5 to 5% by weight of the sodium chloride, such proportions may be as high as about 50% in some instances.

The cohesive agent employed in the instant invention must provide the particles of the tablet with cohesive forces towards each other exceeding the adhesive forces of the particles towards the walls of the tablet punches or presses, whereby fouling and caking of such punches or presses is eliminated and firm, smooth surfaced tablets are obtained. Such agents may be selected from among the substances generally referred to as lubricants, mold lubricants and/or binders and the like. They must, of course, not be obnoxious to health when the tablets are to be employed for treating substances intended for consumption by, or contact with, animals. Although calcium stearate is preferred, calcium and aluminum salts of higher fatty acids such as stearic, palmitic, oleic, linoleic, behenic and lauric acids and the like may generally be employed. Other cohesive agents useful herein include starch, degraded starches such as dextrin, sugar syrups such as molasses, glucose, sorbose, gelatin, casein, glue, saponine, hemi-cellulose (Tragasol), gum acacia, tragacanth, agar, methyl cellulose, carboxymethyl cellulose, polymerized ethylene glycol (Carbowax), polyvinyl alcohol, polymerized N-vinyl lactams such as polyvinylpyrrolidone (PVP), lecithin, hydrated silica, silica gel, silicates, and the like.

Improved results in the treatment of seafoods are in some instances obtained by inclusion in the tablets of a water-soluble inorganic aluminum salt such as aluminum sulfate or sodium aluminum sulfate in proportions of about 1 to 10%, and preferably about 2 to 5% by weight of the sodium chloride. An iron free aluminum salt should be employed which dissolves to a clear solution without cloudiness. It should preferably be composed of particles passing a No. 10 or No. 20 screen (U. S. Sieve Series), and may be admixed into the composition at any stage of the process of this invention prior to tablet pressing. However, unless corrosion-resistant equipment is used, it is preferred to add the aluminum salt together with the cohesive agent.

The following examples, in which parts are by weight in grams (g.) unless otherwise indicated, are illustrative of the instant invention and are not to be regarded as limitative:

*Example 1*

Into a P-K twin shell blender (with intensifier bar) is charged 6543 g. of sodium chloride and 226 ml. of a 50% solution of the calcium disodium salt of EDTA, and the blender run until a thoroughly mixed, smooth stiff paste is obtained. This paste is dried in a tray type hot air oven at 110° C., and the dried mixture ground in a grinding mill into particles about 95% of which pass through a No. 30 stainless steel screen (U. S. Sieve Series). This ground mixture is then thoroughly admixed in the blender with 7.5 g. of calcium stearate, and 141 g. of iron free aluminum sulfate screened to remove +No. 20 screen particles. The resulting mixture is pressed without fouling or caking of the punches into 75 grain tablets.

*Example 2*

The procedure of Example 1 is repeated except that the tablets thus produced are reground into particles about 95% of which pass through a No. 30 screen, and the reground mixture again pressed into 75 grain tablets. This additional procedure is found to eliminate the tendency of some of the tablets to cap as a result of an effect akin to case-hardening. The resulting tablets are uniformly satisfactory in quality, homogeneity, etc.

*Example 3*

The procedure of Example 2 is repeated, except that 282 g. of aluminum sulfate are employed instead of 141 g. Similar results are obtained.

*Example 4*

The procedure of Example 2 is repeated except that no aluminum sulfate is employed. Similar results are obtained.

*Example 5*

Into the P-K blender is charged 240 g. of sodium chloride, 15.0 g. of the calcium disodium salt of EDTA, 37.6 g. of iron-free aluminum sulfate screened to remove +No. 20 screen particles and 10.0 ml. of water, and the blender run until a thoroughly mixed smooth stiff paste is obtained. This paste is dried in the hot air oven at 110° C. and the dried mixture ground into particles about 95% of which pass through a No. 30 screen. This ground mixture is then thoroughly admixed in the blender with 615 g. of sodium chloride and 0.9 g. of calcium stearate, and the resulting mixture pressed without difficulty into 75 grain tablets of acceptable quality.

*Example 6*

The procedure of Example 5 is repeated except that the aluminum sulfate is added with the calcium stearate instead of with the EDTA compound. Similar results are obtained.

*Example 7*

The procedure of Example 6 is repeated except that 2.25 g. instead of 0.9 g. of calcium stearate are employed. Similar results are obtained except that the tablets are a trifle softer.

*Example 8*

The procedure of Example 6 is repeated except that 0.56 g. instead of 0.9 g. of calcium stearate are employed. Similar results are obtained.

From the above it will be understood that in the initial step of forming a homogeneous paste, sufficient water is employed, usually at least about 0.05% by weight of the sodium chloride to yield a paste with the remaining components of the mixture, and the water may preferably contain some or more preferably, all of the EDTA compound dissolved therein. Similarly, the paste may contain all the sodium chloride to be included in the tablets, or only a portion thereof, e. g. in proportions of 1 to 10 parts per part by weight of the EDTA compound, in which case the balance of the salt is added at a stage subsequent to the drying of the paste and prior to the tablet pressing step. In some instances, it is desirable, in the interest of homogeneity and prevention of fouling of the tablet punches, to force the paste prior to drying the same through a No. 10 screen (2 mm. openings) or No. 20 screen (0.84 mm. openings). It will also be understood that improved results may in some instances be attained by applying the regrinding and tablet repressing procedure of Example 2 to the tablets produced in accordance with the procedures of Examples 5–8. Any other form of heat drying equipment may be employed instead of the hot air oven, supplemented if desired by application of a vacuum. Tablets of any size and shape may be formed in accordance with the instant process, and any suitable type of tablet making machine may be used.

The sodium chloride employed in the above examples has a particle size distribution as follows:

5% fails to pass through a No. 30 screen with 0.59 mm. openings

25% fails to pass through a No. 40 screen with 0.42 mm. openings

42% fails to pass through a No. 50 screen with 0.297 mm. openings

16% fails to pass through a No. 60 screen with 0.250 mm. openings

8% fails to pass through a No. 70 screen with 0.210 mm. openings

4% passes through a No. 70 screen

The above screen ratings are those of the U. S. Sieve Series.

In the examples, the grinding operations are carried out with any suitable equipment in a manner effective for producing a particle size distribution approximating that of the sodium chloride.

This invention has been disclosed with respect to certain preferred embodiments, and it will be understood that other modifications and variations will become obvious to persons skilled in the art. Such modifications and variations are to be included within the spirit and scope of this invention.

What is claimed is:

1. A process comprising thoroughly admixing sodium chloride and at least about 0.5% of a water-soluble EDTA compound by weight of the sodium chloride with sufficient water to yield a substantially homogeneous paste, drying the paste, grinding the dried mixture into particles at least about 85% of which have a size passing a No. 30 screen, thoroughly admixing about 0.05 to 2.0% of a cohesive agent into the ground mixture, and pressing the resulting mixture into tablets.

2. A process as defined in claim 1 in which the EDTA compound and water are added as a solution.

3. A process as defined in claim 1 in which said EDTA compound is the calcium disodium salt of EDTA.

4. A process as defined in claim 1 in which said cohesive agent is calcium stearate.

5. A process as defined in claim 1 in which about 1 to 10% of a water-soluble aluminum sulfate by weight of the sodium chloride is added to the mixture at a stage prior to the pressing thereof into tablets.

6. A process as defined in claim 1 in which said paste is pressed through a No. 10 screen prior to its being dried.

7. A process as defined in claim 1 followed by the steps of regrinding the tablets into particles at least about 85% of which have a size passing a No. 30 screen, and repressing the reground mixture into tablets.

8. A process comprising thoroughly admixing sodium chloride and about 10 to 100% of a water-soluble EDTA compound by weight of the sodium chloride with sufficient water to yield a substantially homogeneous paste, drying the paste, grinding the dried mixture into particles at least about 85% of which have a size passing a No. 30 screen, thoroughly admixing into the ground mixture sufficient sodium chloride to reduce the proportion of said EDTA compound to about 0.5 to 5% by weight of the sodium chloride, and about 0.05 to 2.0% of a cohesive agent by weight of the mixture, and then pressing the resulting mixture into tablets.

9. A process as defined in claim 8 in which said EDTA compound is the calcium disodium salt of EDTA.

10. A process as defined in claim 8 in which said cohesive agent is calcium stearate.

11. A process as defined in claim 8 in which about 1 to 10% of a water-soluble aluminum sulfate by weight of the sodium chloride is added to the mixture at a stage prior to the pressing thereof into tablets.

12. A process as defined in claim 8 in which said paste is pressed through a No. 10 screen prior to its being dried.

13. A process as defined in claim 8 followed by the steps of regrinding the tablets into particles at least about 85% of which have a size passing a No. 30 screen, and repressing the reground mixture into tablets.

14. A firm tablet of substantially uniform composition throughout composed essentially of sodium chloride about 0.5% to 50% of a water-soluble EDTA compound by weight of the sodium chloride and about 0.05 to 2.0% of a cohesive agent by weight of the tablet.

15. A tablet as defined in claim 14 in which the EDTA compound is the calcium disodium salt of EDTA and the cohesive agent is calcium stearate.

16. A firm tablet of substantially uniform composition throughout composed essentially of sodium chloride, about 0.5% to 50% of a water-soluble EDTA compound and about 1 to 10% of a water-soluble aluminum sulfate by weight of the sodium chloride and about 0.05 to 2.0% of a cohesive agent by weight of the tablet.

17. A tablet as defined in claim 16 in which the EDTA compound is the calcium disodium salt of EDTA and the cohesive agent is calcium stearate.

References Cited in the file of this patent
UNITED STATES PATENTS

| | | |
|---|---|---|
| 2,669,520 | Fellers | Feb. 16, 1954 |
| 2,680,076 | Swaine | June 1, 1954 |
| 2,784,101 | Diamond | Mar. 5, 1957 |

OTHER REFERENCES

"Manufacture of Compressed Tablets," by Silver et al.: Copyright 1944, F. J. Stokes Machine Co., Philadelphia, Pa., pp. 5–22.